Oct. 9, 1928.
H. WHITE, JR
1,687,412
HOLDER FOR WINDSHIELD WIPERS
Filed July 21, 1927
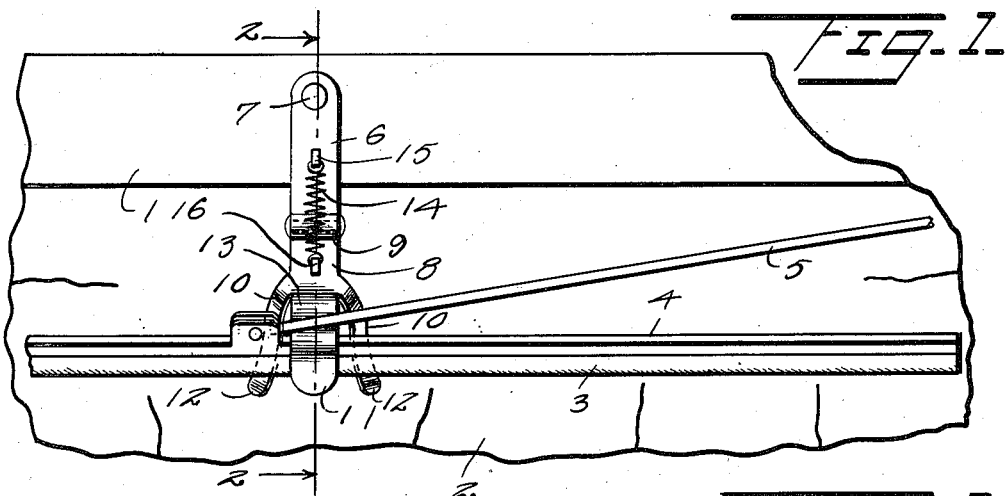
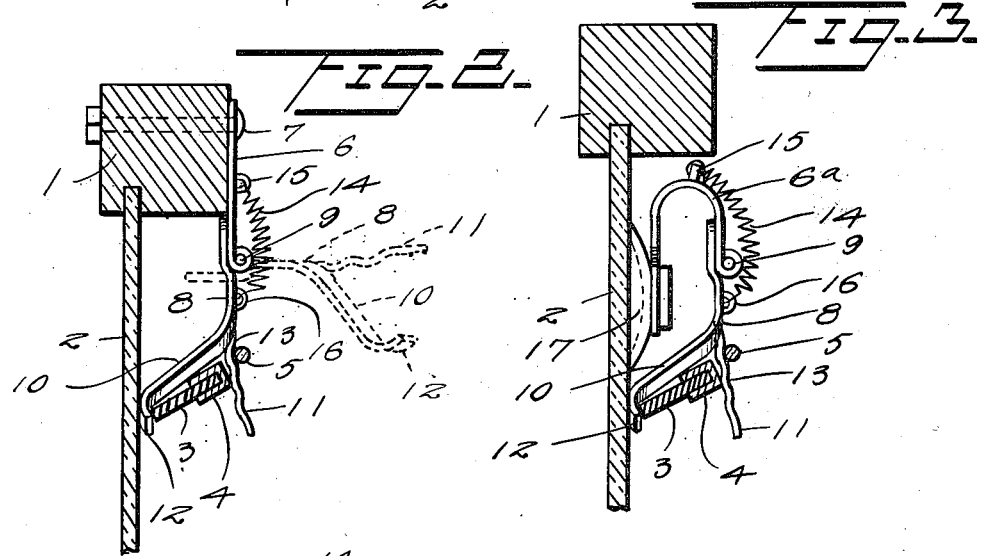
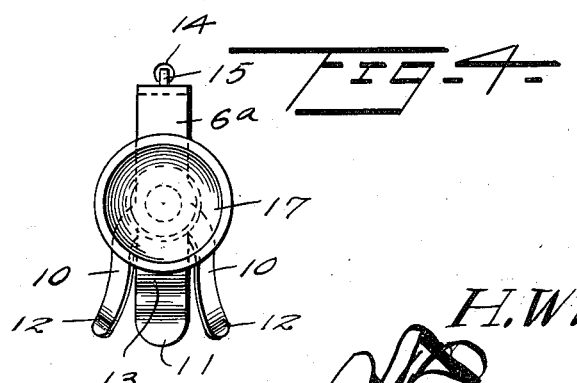
INVENTOR.
H. White, Jr
ATTORNEY.

Patented Oct. 9, 1928.

1,687,412

UNITED STATES PATENT OFFICE.

HENRY WHITE, JR., OF BUFFALO, NEW YORK.

HOLDER FOR WINDSHIELD WIPERS.

Application filed July 21, 1927. Serial No. 207,497.

This invention relates to and has for one of its objects to provide a device which shall be adapted, when the windshield wiper of an automobile is not in use, to hold the squeegee or rubber strip of the wiper out of contact with the glass of the windshield, whereby to prevent the distortion or flattening of the rubber strip under the pressure with which it is urged in the direction of the glass.

A further object of the invention is to provide a device of the character stated which shall be adapted to also hold the rubber strip of the windshield wiper out of the field of vision of the driver of the automobile.

A further object of the invention is to provide a device of the character stated which shall be adapted to automatically release the rubber strip when the windshield wiper is placed in operation and which shall be adapted immediately thereafter to assume a position in which it will not interfere with the operation of the wiper.

A further object of the invention is to provide a device of the character stated which may be manufactured and sold at a low cost and which may be readily secured to the frame or the glass of the windshield.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is an elevational view illustrating the application of the device,

Figure 2 is a sectional view taken on the vertical plane indicated by the line 2—2 of Figure 1, Figure 3 is a view similar to Figure 2 illustrating the application of a slightly modified form of the device, and Figure 4 is a view in rear elevation of the modified form of the device.

Referring in detail to the drawing, 1 designates the frame and 2 the glass of the windshield of an automobile. 3 designates the rubber wiping strip, 4 the wiping strip carrying bar and 5 the arm of a windshield wiper which may be of the motor or manually operable type. The rubber strip 3 is held in contact with the glass 2 under considerable pressure, and due thereto it is, when not in use distorted and flattened to such an extent as to materially reduce its efficiency.

The device for holding the rubber strip 3 out of contact with the glass when the windshield wiper is not in use, so as to prevent the distortion or flattening of the rubber strip, comprises a bracket 6 which is secured in a vertical position to the front side of the top bar of the windshield frame 1. The bracket 6 is secured in place by a bolt 7, and it extends below the lower side of the top bar of the windshield frame 1. A holder 8 is pivoted between its ends to the lower end of the bracket 6, as shown at 9, and the lower portion thereof is formed to provide downwardly and rearwardly extending arms 10 and a downwardly and forwardly extending arm 11. The arms 10 are relatively spaced and have forwardly curved lower ends 12 which contact with the front side of the windshield glass 2. The arm 11 is positioned centrally between the arms 10, and it is provided with transversely extending grooves or depressions 13. The upper portion of the holder 8 contacts with the rear side of the bracket 6 in order to limit the distance that the holder 8 may swing rearwardly on its pivot 9. An expansion spring 14 is secured to the front side of the bracket 6 as at 15 and to the corresponding side of the holder 8 as at 16.

Instead of securing the device to the top bar of the windshield frame 1, it may be secured to the windshield glass 2 by means of a vacuum cup 17, as shown in Figures 3 and 4. The device shown in these figures is similar to the one shown in Figures 1 and 2 with the exception that the bracket here designated 6ª, is of U-form to permit of the use of the vacuum cup 17. The remaining parts of this device are designated by the same reference numerals employed to designate the corresponding parts of the device shown in Figures 1 and 2.

In practice, the spring 14 supports the holder 8 in the elevated position indicated by dotted lines in Figure 2, when the windshield wiper is in operation. When the windshield wiper is not in operation, the holder 8 is swung by hand against the tension of the spring 14, and thereafter the rubber strip 3 and its carrying bar 4 are positioned between the arms 10 and 11 with the rubber strip in contact with the curved ends 12 of the arms, and the arm 5 is positioned in one of the grooves 13 in the front side of the arm 11. The rubber strip 3 will be held out of contact with the windshield glass 2, and the arm 11 prevents the arm 5 from pressing the strip 3 against the arms 10, with the result that the rubber strip will not be distorted or flattened. When the windshield wiper is set in operation, the rubber strip 3, its carrying bar 4 and the arm 5 are moved downwardly out of contact with the arms 10 and 11, and immediately thereafter the spring 14 will return the holder 8 to its elevated position in which position it will not interfere with the operation of the windshield wiper.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:

1. In combination, an oscillating wiper for a windshield, a holder for the wiper when the latter is not in use, means supporting the holder for movement into and out of the path of the wiper, and means adapted to normally retain the holder out of the path of the wiper.

2. In combination, a windshield wiper embodying an oscillating arm and a wiping strip carried by the arm, and a holder connected to the windshield and provided with downwardly and rearwardly extending arms against which the strip rests when the wiper is not in use and with a downwardly and forwardly extending arm against which said first arm rests when the wiper is not in use.

3. In combination, a windshield wiper embodying an oscillating arm and a wiping strip carried by the arm, a bracket secured to the windshield, a holder pivoted to the bracket and provided with arms against which the strip and said first arm rests when the wiper is not in use, and a spring connected to the bracket and holder and adapted to move the holder out of the path of the wiper on the withdrawal of the wiper from the holder.

In testimony whereof I affix my signature.

HENRY WHITE, JR.